US006961735B2

(12) United States Patent
Gargya et al.

(10) Patent No.: US 6,961,735 B2
(45) Date of Patent: Nov. 1, 2005

(54) METHOD AND A BRIDGE FOR COUPLING A SERVER AND A CLIENT OF DIFFERENT OBJECT TYPES

(75) Inventors: Tony Gargya, Tuebingen (DE); Peter Fischer, Kronach (DE); Wolfgang Taphorn, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/087,723

(22) Filed: Mar. 1, 2002

(65) Prior Publication Data

US 2002/0124113 A1 Sep. 5, 2002

(51) Int. Cl.$^7$ .............................................. G06F 17/30
(52) U.S. Cl. ..................................... 707/104.1; 707/10
(58) Field of Search ............................ 707/2, 10, 102; 705/14, 26, 30; 709/217, 224, 229, 228; 714/4, 714/114; 717/174, 114

(56) References Cited

U.S. PATENT DOCUMENTS

| 5,696,965 A | * | 12/1997 | Dedrick ........................ 707/10 |
| 5,913,061 A | | 6/1999 | Gupta et al. ................. 719/310 |
| 6,085,030 A | | 7/2000 | Whitehead et al. ......... 709/203 |
| 6,085,220 A | | 7/2000 | Courts et al. ............... 709/201 |
| 6,094,688 A | | 7/2000 | Mellen-Garnett et al. ... 719/328 |
| 6,115,646 A | | 9/2000 | Fiszman et al. ............ 700/181 |
| 6,151,600 A | * | 11/2000 | Dedrick ........................ 707/10 |
| 6,182,154 B1 | | 1/2001 | Campagnoni et al. ...... 709/315 |
| 6,269,373 B1 | * | 7/2001 | Apte et al. ..................... 707/10 |
| 6,546,546 B1 | * | 4/2003 | Van Doorn .................. 717/114 |

FOREIGN PATENT DOCUMENTS

EP 0822492 A2 2/1998 ............. G06F 9/46

OTHER PUBLICATIONS

Cape Clear, CapeConnect 1.0 Technical Overview, Feb. 2001, pp. 1-30.*
Marty Hall, Core Servlets and JavaServer Pages, May 2000, Sun Microsystems and Prentice Hall, pp. 21-63.*
Larry L. Peterson, A Yellow-Pages Service for a Local-Area Network, Department of Computer Science, University of Arizona, 1988, ACM, pp. 235-242.*
Kalibera, T. "Mapping CORBA and SOAP", Distributed Systems Research Group Seminars, Charles University, Prague, XP-002242298, Oct. 31, 2000.
Kalibera, T. "Mapping CORBA and SOAP", Distributed Systems Research Group Seminars, Charles University, Prague, Browser Page XP-002242300, URL: http:\\nenya.ms.mff.cuni.cz\teaching\seminars\200-10-31-kalibera-corba-soap\referat.html, Oct. 31, 2000.
Anonymous: "Rogue Wave XML-CORBA Link:: XML Access to CORBA-based Systems", Rogue Wave Software Technical White Papers, XP-002242299, Aug. 24, 2000.
Anonymous: "Rogue Wave XML-CORBA Link:: XML Access to CORBA-based Systems", Rogue Wave Software Technical White Papers, "Internet archive query results for http\\www.roguewave.com/products/whitepapers/xorbawp_wl.cfm" Browser Window, XP002242301, Aug. 24, 2000.

* cited by examiner

Primary Examiner—Apu M. Mofiz
(74) Attorney, Agent, or Firm—Hoffman, Warnick & D'Alessandro, LLC; Jerry W. Herndon

(57) ABSTRACT

A computer system has clients and servers of different object models, such as SOAP, CORBA and EJB for providing distributed application services. To connect a SOAP client to a CORBA or EJB server, a bridge 10 is used containing corresponding server and client components as well as a mapping component to map object and method requests of one type into another.

16 Claims, 4 Drawing Sheets

METHOD AND A BRIDGE FOR COUPLING A SERVER AND A CLIENT OF DIFFERENT OBJECT TYPES

BACKGROUND OF THE INVENTION

1. Technical Field

The invention relates to a bridge for coupling a client to a server computer and to a corresponding method, computer system and a computer program.

2. Related Art

From Statutory Invention Registration U.S. H1,895 an application provider and method for communication is provided for communication of an application provider between a first sub-system and a second sub-system of a common node.

For example, the application provider may be a mobile application provider, the first and second sub-systems may be a home location register and a visitor location register, and the common node may be a wireless telecommunication system. The system is implemented by means of an object request broker (ORB) such as the common request broker architecture (CORBA) defined by the object management group (OMG). A resource manager application serves as a "bridge" or "conduit" between a call processor and a resource assembly.

From U.S. Pat. No. 6,094,688 a system is known for modular application collaboration including filtering at the source and proxy execution of compensating transactions to conserve server resources. This system provides interoperability between applications including a plurality of connectors for communicating with a like lurality of applications and an interchange server.

The interchange server includes an application collaboration module and service module. The services module transfers messages between connectors and the application collaboration module. The application collaboration defines the interoperability between two or more applications. The interchange server service module includes a transaction service and an error service. Transactions are executed in the application collaboration module.

From U.S. Pat. No. 6,085,220 an enterprise interaction hub for managing an enterprise web system is known. The enterprise interaction hub includes a number of layers that interact to manage an enterprise web system.

An interaction layer receives requests to the enterprise web system and returns responsive web pages. A presentation layer is coupled to the interaction layer and generates the responsive web pages. A business layer is coupled to the presentation layer and provides business logic for use by the presentation layer in generating the responsive web pages.

An integration layer is coupled to the business layer and interfaces with existing legacy data to provide the legacy data to the business layer. A trend collection layer monitors and accumulates historical information from the interaction layer, the presentation layer, the business layer and the integration layer. The trend collection layer also stores the historical information in a trend database.

A profile database, accessible by the presentation layer and the business layer, stores profile data, including data mined from the trend database, that characterizes individual user access to the enterprise web system. The profile data is used by the presentation layer and the business layer to provide customized dynamic content in the generated web pages.

From U.S. Pat. No. 6,085,030 a network component server is known. The component server architecture enables consumer nodes of a computer network to interact with heterogeneous software components and services distributed throughout the network, as well as network devices and data.

Distributed interactions between a consumer and a heterogeneous software is achieved, in part, by registering and locating the component and services. An object neutral global component registry with access controls of the architecture interoperates with the component management service to transparently ensure proper administration, of indication and run-time binding access to components offered in response to requests from applications executing on the consumer nodes.

The architecture is implemented on a component server node of the network that is configured to communicate with the consumer, i.e., client, nodes in client-server computing arrangements. That is, the component registry of the component server node responds to a consumer application request by locating a heterogeneous component for the consumer. The registry offers this component to the consumer by providing an appropriate interface between the object module of the software component. This registry is organized as a plurality of cooperating storage entities including a description repository, an offer repository, an interface adapter repository and an object factory repository.

A component server architecture is provided to interact with heterogeneous software components and services distributed throughout the network, as well as with network devices and data. Distributed interaction between a consumer and heterogeneous software is achieved, in part, by registering and locating the components and services.

An object-neutral global component registry with access controls of the architecture interoperates with a component management service (CMS) to transparently ensure proper administration, authentication and run-time binding access to components offered in response to requests from applications executing on the consumer nodes. The architecture is implemented on a component server node of the network that is configured to communicate with the consumer, i.e., client, nodes in client-server computing arrangements. That is, the component registry of the component server node responds to a consumer application request by locating a heterogeneous component for the consumer. The registry offers this component to the consumer by providing an appropriate interface between the object module of the consumer and the object module of the software component.

This registry is preferably organized as a plurality of cooperating storage entities including a description repository, an offer repository, an interface adapter repository and an object factory repository.

From U.S. Pat. No. 5,913,061 a modular application collaborator is known for providing inter-operability between applications including a plurality of connectors for communicating with a like plurality of applications and an interchange server. The interchange server includes an application collaboration module and a service module.

The service module transfers messages between connectors and the application collaboration module. The application collaboration module defines the inter-operability between two or more applications and includes a trigger and a transaction responsive to the trigger. The trigger is activated upon receipt of data from one or more connectors resulting in the transaction delivering data to one or more connectors for transfer to an associated application.

From U.S. Pat. No. 6,115,646 a dynamic and generic process automation system is known. This includes a generic object-oriented process automation engine that provides workflow management services in a heterogeneous distributed computing environment. The system consists of three major parts: a build time part used to capture and store process definitions, and to request the enactment of a process; a run time part used to schedule, execute, and monitor the requested process; a CORBA to plug-in-software applications needed to execute processes and to allow interactions among the system components. This system is event-driven and provides scheduling and resource allocations schemes.

The system can incorporate a trader service which provides a "yellow pages" for objects; it allows objects to publicize their services and allow clients to find them based on upon which services the client needs. For example, a resource allocator can use the service to find a resource that satisfies a set of agents constrains.

The above referenced prior art systems and methods mostly rely on object oriented software technologies, such as CORBA. CORBA is a vendor-independent architecture and infrastructure that computer applications use to work together over networks. In CORBA, every object instance has its own unique object reference, an identifying electronic token.

Clients use the object references to direct their invocations, identifying to the object request broker the exact instance they want to invoke. The client acts as if its invoking an operation on the object instance, but it is actually invoking on the IDL stub which acts as a proxy. Passing through the stub on the client side, the invocation continues through the object request broker, and the skeleton on the implementation side, to get to the object where it is executed on the server.

The object request broker provides a mechanism for transparently communicating client requests to target object implementations. The object request broker simplifies distributed programming by decoupling the client from the details of the method invocations. This makes client requests appear to be local procedure calls. When a client invokes an operation, the object request broker is responsible for finding the object implementation, transparently activating it if necessary, delivering the request to the object and returning any response to the caller.

The IDL stubs and skeletons serve as the "glue" between the client and the server applications, respectively, and the object request broker. The transformation between IDL definitions and the target programming language is automated by a IDL compiler. The use of a compiler reduces the potential for inconsistencies between client stubs and server skeletons and increases opportunities for automated compiler optimizations.

Another important object oriented technology is Enterprise Java Beans. Enterprise Java Beans provides a framework for components that can be "plugged in" to a server, thereby extending that service functionality. Client programs execute methods on remote Enterprise Java Beans by way of an Enterprise Java Beans object. The Enterprise Java Beans object implements the "remote interface" of the EJB component on the server.

A common disadvantage of the CORBA and Enterprise Java Beans object technologies is that corresponding applications being available in an company's intranet are not accessible through a firewall from the internet.

For this and other reasons companies recently have started to use the Simple Object Access Protocol (SOAP) as the object oriented technology of choice as (SOAP) is firewall compatible. SOAP is a protocol for exchange of information in a decentralized, distributed environment. It is an XML based protocol that consists of three parts: an envelope that defines a framework for describing what is in a message and how to process it, a set of encoding rules for expressing instances of applications—defined data types, and a convention for representing remote procedure calls and responses. SOAP can be used in combination within an HTTP extension framework.

FIG. 1 shows an example of a prior art network. The network includes internet 1 and intranet 2 which are separated by firewall 3. A SOAP client 4 is coupled to SOAP server 5 via internet 1.

Within the companies' intranet 2 a CORBA client 6 and an EJB client 7 are coupled to a CORBA server 8 and an EJB server 9, respectively.

Because of the tight coupling between the CORBA and EJB clients 6, 7 and their respective servers 8, 9 the applications of servers 8 and 9 are not accessible through the firewall 3 from the internet 1. As a consequence the SOAP client 4 can only access the SOAP server 5—or other servers which are not shown in FIG. 1—over the internet 1 but can not access applications provided on servers 8 or 9 in the company intranet 2. This is a serious disadvantage for offering a variety of applications to customers, in particular if existing CORBA and EJB systems are available.

SUMMARY OF THE INVENTION

The invention aims to provide a solution for the above described prior art problem and provides an improved method for coupling of different types of client and server objects as well as a corresponding computer system, methods and computer program products as claimed in the independent claims.

The invention couples a client of a first object type, for example a SOAP client, to a server of a second object type, for example a CORBA or a EJB server. The coupling can be achieved over the internet, intranet and firewalls.

In a preferred embodiment this is accomplished by providing a bridge for coupling server and client components of different object types to provide a communication path between the respective client and server via the bridge. The bridge contains a mapping component for mapping of objects of a first type to objects of a second type, for example mapping of SOAP objects to CORBA or EJB objects and vice versa.

The invention is advantageous in that it removes the requirement for using stubs and skeletons for SOAP generated objects by reusing the already existing client stubs of the CORBA and EJB servers and by creating a generic meta program to locate the initial contexts and homes by accessing pre-configured information. The SOAP based clients must specify the object name, the method name and the parameters.

In addition, the uniform resource locator of the bridge is published together with CORBA and EJB application capabilities to a web directory. Web service requesters—after determining that their "real" service provider can only be accessed by CORBA and EJB protocols—can access the bridge. The bridge then passes on the request "in proxy" to the actual CORBA or EJB service. One application is to store the uniform resource locator of the bridge in a yellow pages type server.

This way the invention realizes distributed application services where parts of the application can be distributed over the internet and intranet being separated by firewalls. This is of particular importance for usage of existing applications which are not firewall capable in such distributed environments.

BRIEF DESCRIPTION OF THE DRAWINGS

In the following, the invention is explained in more detail with respect to the drawing in which

FIG. 2 shows a computer system—using like new numerals for like components as in FIG. 1—having a SOAP client 4 and a SOAP server 5 that are coupled by internet 1. The bridge 10 is contained in the intranet 2, which is coupled to the internet 1 via firewall 18. Intranet 2 further contains CORBA client 6 and EJB client 7 that are coupled to CORBA server 8 and EJB server 9, respectively.

DETAILED DESCRIPTION OF THE INVENTION

Figure 1:
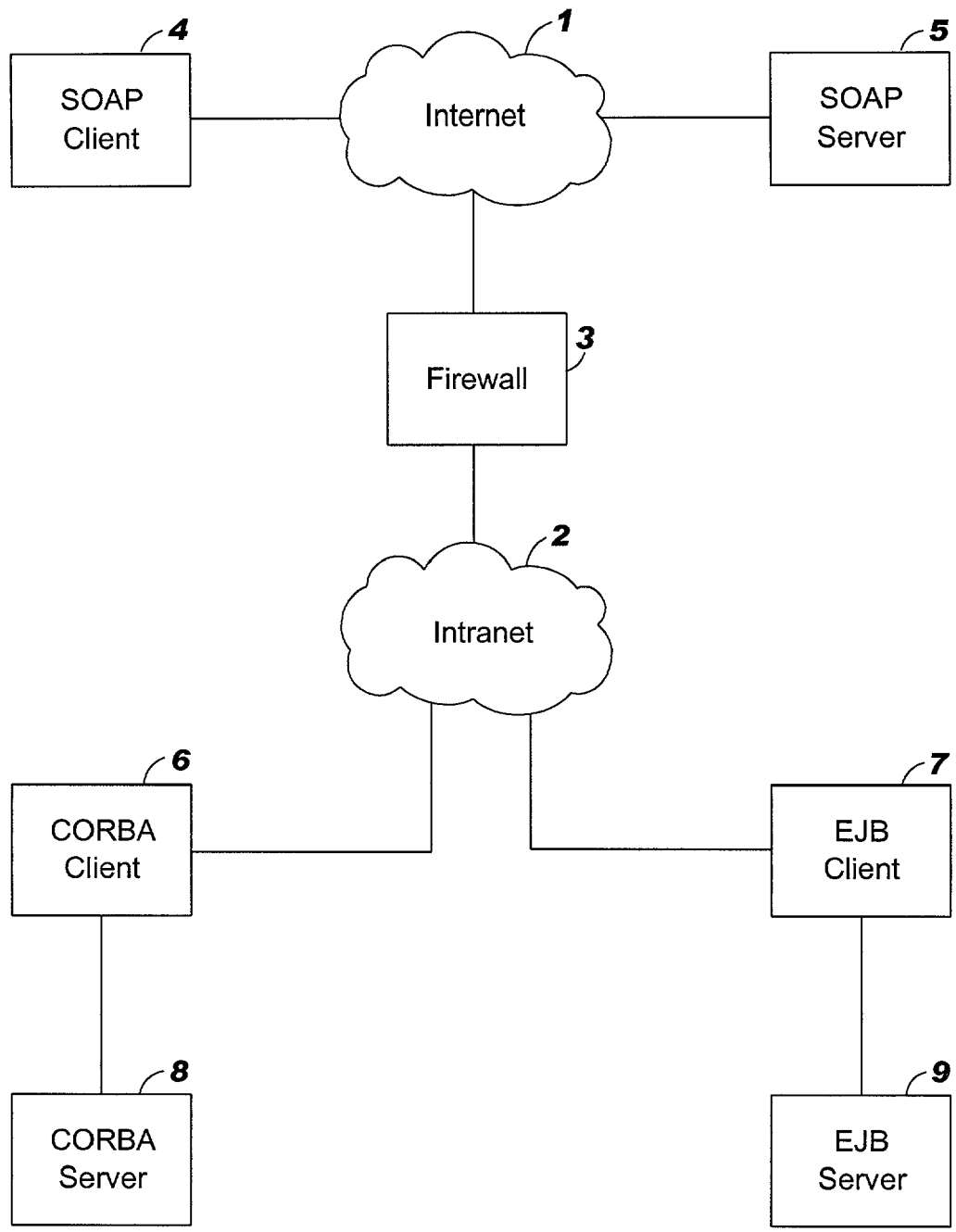
FIG. 1 is a prior art computer system having server and clients of different object types.

The bridge 10 contains a SOAP server component 11 and a SOAP component client 12. The SOAP server component 11 establishs a communication path between the SOAP client 4 and bridge 10 via the internet 1, whereas the SOAP client 12 serves to establish a communication path between the bridge 10 and the SOAP server 5 via the internet 1—depending on the particular application.

The bridge 10 further comprises an EJB client component 13 and an EJB server component 14. The EJB client component 13 establishs a communication path between the bridge 10 and the EJB server 9, whereas the EJB server component 14 establishs a communication path between the EJB client 7 and the bridge 10 via the intranet 2. Likewise, the bridge 10 contains CORBA client component 15 and CORBA server component 16. The CORBA client 15 establishs a communication path between the bridge 10 and CORBA server 8, whereas the CORBA server component 16 establishs a communication path between CORBA client 6 and the bridge 10.

The bridge 10 further comprises a mapping component 17 for mapping of an object of a first type to an object of a second type and mapping of corresponding method requests and parameters. For example the mapping component 17 can map a SOAP based method request to a CORBA or EJB method call at run-time. Likewise the mapping component 17 can map CORBA or EJB method calls to SOAP based method requests.

Figure 2:
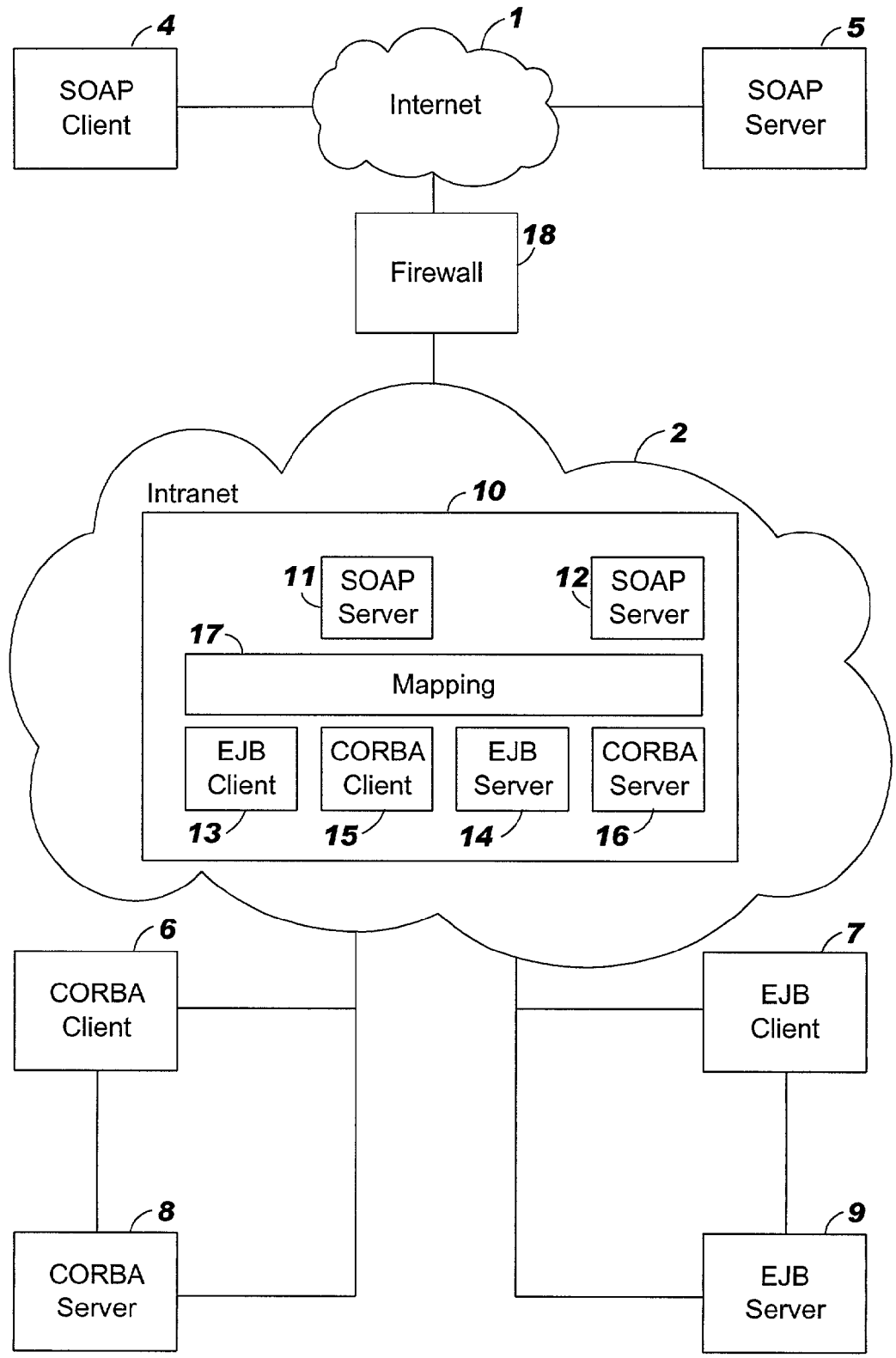
FIG. 2 is a computer system having an embodiment of the bridge of the invention.

The bridge 10 has a uniform resource locator as well as the other server and client entities as depicted in FIG. 2.

The usual operation of SOAP client 4 is to access the SOAP server 5 with an application request via the internet 1. In case the desired application is not a SOAP application but—in the example considered here—a CORBA or EJB application running on a server of intranet 2, the SOAP client 4 must first access the bridge 10.

This is done for example by providing the uniform resource locator of the bridge 10 to the SOAP client 4. This access request of SOAP client 4 also includes a parameter for indicating the object type of the desired application and further parameters for input into the application on the remote server.

The access request of SOAP client 4 based on the uniform resource locator of bridge 10 invokes the SOAP server component 11, which appears to SOAP client 4 to be a usual SOAP server. Therefore the operation of SOAP client 4 does not need to be modified in any respect. Based on the object type of the desired application a corresponding client component of that object type is selected by the bridge 10.

For example, assume that SOAP client 4 desires access to a CORBA type application on server 8. This is indicated by the SOAP client 4 to the bridge 10 in its access request by specifying the object type of the application. Based on this indication of the object type, the CORBA client component 15 is selected and activated by the bridge 10.

The CORBA client component 15 appears to the CORBA server 8 to be a usual CORBA client; therefore the operation of the CORBA server 8 does not need to be changed in any respect for integration into the computer system of FIG. 2. This way communication paths are established between the SOAP client 4 and the SOAP server component 11 as well between the CORBA client component 15 and the CORBA server 8.

A SOAP based method request of SOAP client 4 is received by bridge 10 by means of its SOAP server component 11. From there it is inputted into the mapping component 17. The mapping component 17 provides a CORBA method call having the same functionality as the inputted SOAP based method request. This CORBA method call is inputted into the CORBA client component 15 from where it is transmitted to the CORBA server 8.

This invokes the desired application on CORBA server 8. The parameter data provided by the SOAP client 4 is inputted into the application of CORBA server 8. For example, the application of CORBA server 8 can be a financial services application, such as portfolio management or financial planning.

In this case the input parameters provided by the SOAP client 4 can be stock market data or the like on which the analysis of the application is based. These input parameters for the application program are transmitted from the SOAP client 4 to the SOAP server 11 and to the CORBA server 8 via mapping component 17 and CORBA client component 15.

Figure 3:
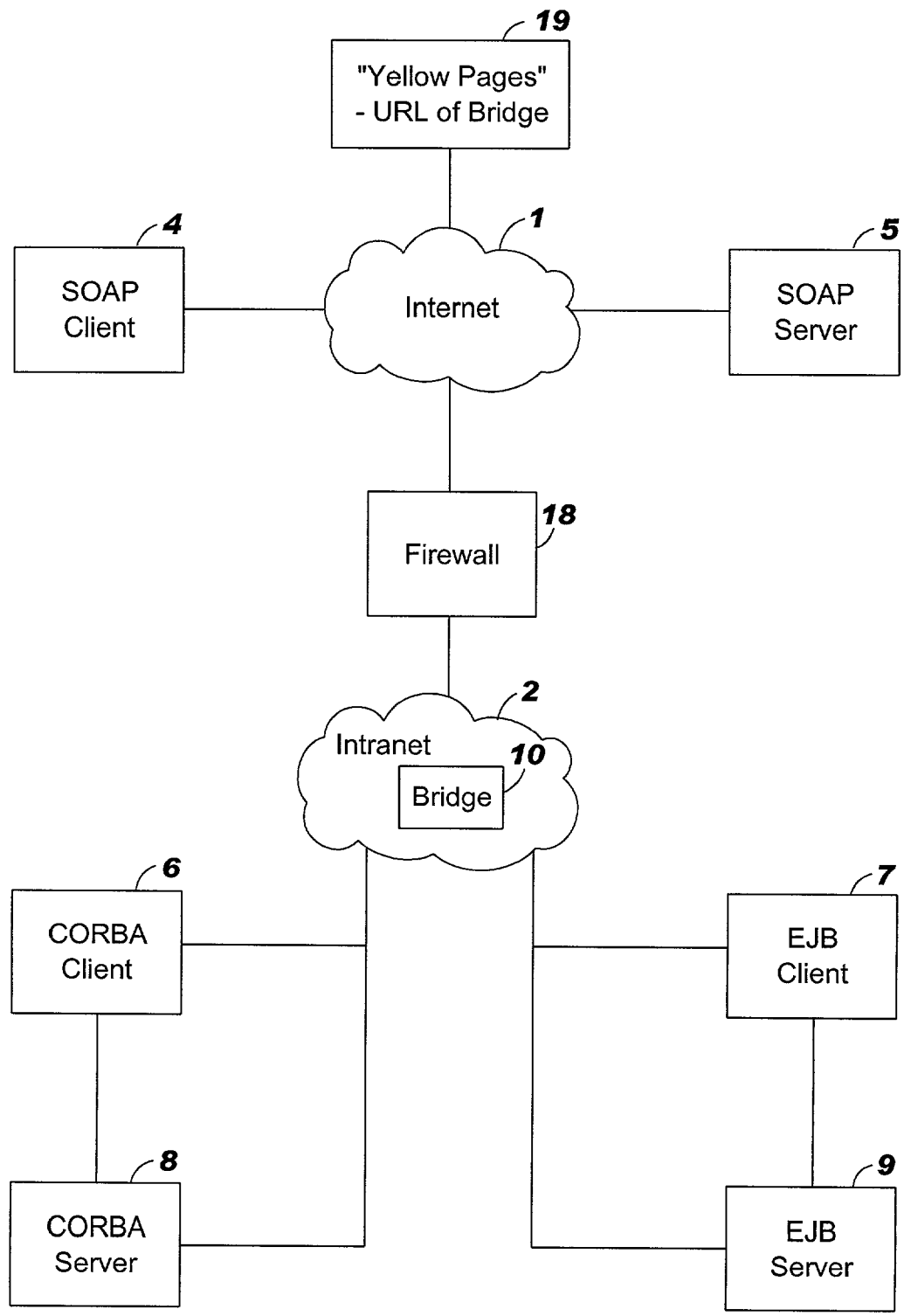
FIG. 3 is the computer system of FIG. 2 having a yellow pages server for locating an application service in the internet or intranet.

FIG. 3 shows a further preferred embodiment having an additional yellow pages type server 19. The server 19 has a data base which contains a number of available application services and corresponding object types of the application services as well as the uniform resource locator of an application service. The database can be searched based on key words, such as by a Boolean key word search. The SOAP client 5 can connect to the server 19 via internet 1 to query server 19 to locate a desired application service.

A corresponding query inputted by the SOAP client 4 into the server 19 results in a hit list from which the SOAP client 4 selects a particular application service. By selecting the application service on this hit list the object type of the application service as well as its uniform resource locator are provided to the SOAP client 4. In addition the date base also contains a uniform resource locator of the bridge 10 for providing a communication path to a desired application service. This uniform resource locator of the bridge 10 is also provided by the server 19 to the SOAP client 4.

For example, assume that the desired financial services application is of the CORBA object type. As the CORBA and SOAP object types differ it is inferred in the SOAP client 4 that access to the required CORBA server 8 is only possible via the bridge 10. Hence SOAP client 4 performs an access operation to the bridge 10 by means of the uniform resource locator of the bridge 10 and provides the object type and the uniform resource locator of the application service to the bridge 10. Again, further input parameters for input into the application service program can be provided by the SOAP client 4.

Based on the object type and the uniform resource locator of the desired application service the bridge establishes a communication link between its CORBA client component 15 (cf. FIG. 2) and its CORBA server 8. This way the SOAP client can communicate with the CORBA server 8 as explained in detail with respect to FIG. 2.

Figure 4:
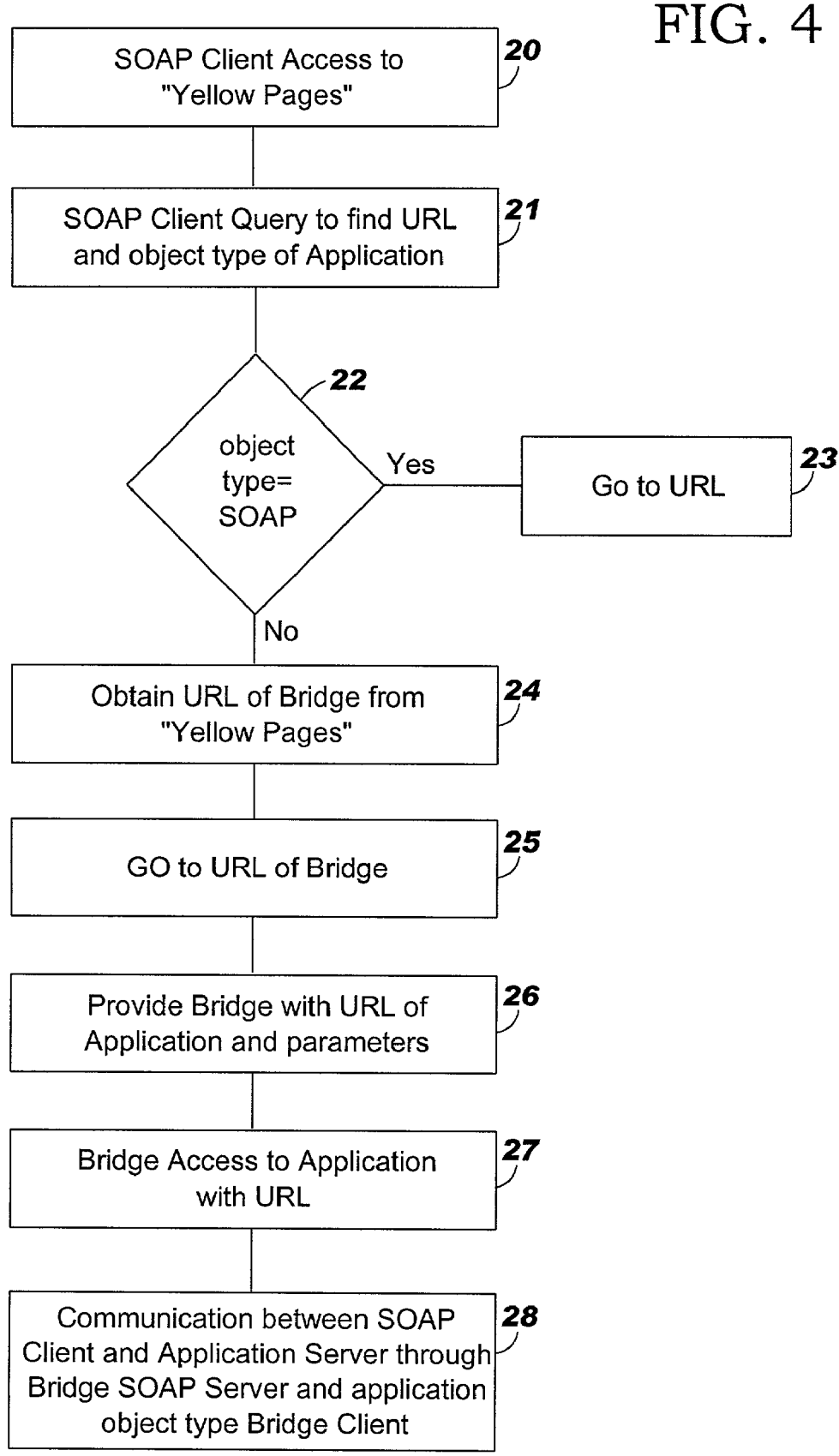
FIG. 4 is a flow chart of an embodiment of the invention for coupling objects of different types.

FIG. 4 shows a preferred embodiment of the method of the invention. In step 20 the SOAP client performs an access operation to a yellow pages type server to identify a desired application. In step 21 the SOAP client queries the yellow pages server to find the URL of the desired application and its object type. In addition, the URL for a corresponding bridge results from the query for access to the application.

In step 22 it is decided whether the object type of the application is of the type "SOAP".

If this is the case, the SOAP client directly connects to the application service in step 23 by entering the URL of the application service into its web browser program.

If the contrary is the case, the SOAP client obtains the URL of the bridge from the yellow pages server in step 24 to access the bridge by means of this URL in step 25.

In step 26 the bridge is provided with the URL of the desired application service and further parameters, such as data indicative of the object type of the application and input parameters for the application.

In step 27 the bridge creates a communication path to a server containing the desired application based on the URL provided by the SOAP client requests. After this communication path is created the communication between the SOAP clients and the application server through the bridge can start at step 28.

The communication is established and maintained through the server component and the CORBA client component of the bridge by means of the intermediary mapping component of the bridge.

Likewise, it is possible to establish a communication path between a CORBA client and a SOAP server or between an EJB client and a SOAP server by using the corresponding client and server components of the bridge 10. This way it is possible to build distributed application services relying on a variety of object type applications being distributed over different kinds of networks separated by firewalls.

What is claimed is:

1. A bridge for coupling a client (4) of a first object type to a server (8, 9) of a second object type, the bridge comprising a server component (11) of the first object type, a client component (13) of the second object type, a receiving component for a uniform resource locator of the server and for parameter data indicative of the second object type for selection of the second object type client component and a mapping component (17) for mapping of objects of the first object type to corresponding objects of the second object type.

2. The bridge of claim 1 wherein the first object type uses the simple object access protocol (SOAP) type.

3. The bridge of claim 1 or claim 2 wherein the second object type is the enterprise Java Beans (EJB) type or the common object request broker architecture (CORBA) type.

4. The bridge of claim 1 wherein the bridge has means for coupling to the client of the first object type via the internet.

5. The bridge of claim 1 or claim 4 wherein the bridge has means for coupling to the server via an intranet.

6. The bridge of claim 1 or claim 4 wherein the bridge has an assigned uniform resource locator (URL) for access of the bridge from the client.

7. The bridge of claim 1 or claim 4 further comprising a receiving component for application specific parameters to be provided to the server as input data.

8. A computer system having a client computer of a first object type and a bridge in accordance with claim 1 or claim 4 for establishing a communication path between the client computer and a server computer of a second object type.

9. The computer system of claim 8 having a firewall component (18) in the communication path.

10. The computer system of claim 8 wherein the client computer has means for accessing a yellow pages type server for querying the yellow pages type server to obtain a uniform resource locator of a desired location of the sewer computer.

11. The computer system of claim 10 wherein the yellow page server provides the object type of the application and, in case of different server and client object types, the uniform resource locator of the bridge.

12. A method for coupling a client (4) of a first object type to a server (8, 9) of a second object type via a bridge, the bridge comprising a server component (11) of the first object type, a client component (13) of the second object type and a mapping component (17) for mapping of objects of the first object type to corresponding objects of the second object type, the method comprising the steps of
    coupling the client to the bridge,
    providing a uniform resource locator of the server to the bridge and providing parameter data to the bridge indicative of the object type of the server,
    coupling the bridge to the server via the client component of the bridge having the same object type as the server.

13. The method of claim 12 further comprising the steps of
    querying a yellow page type server by the client for finding a desired application,
    providing a uniform resource locator of the application and the object type of the application to the client and
    providing die uniform resource locator of the application from the client to the bridge.

14. A system for automatically coupling a client of a first object type to a server of a second object type, the system comprising means adapted for carrying out the steps of the method according to anyone of the claims 12 or 13.

15. A data processing program for execution in a data processing system comprising software code portions for performing a method according to anyone of the claims 12 or 13 when the program is run on that computer.

16. A computer program product stored on a computer usable medium, comprising computer readable program means for causing a computer to perform a method according to anyone of the claims 12 or 13 when the program is run on the computer.

* * * * *

UNITED STATES PATENT AND TRADEMARK OFFICE
CERTIFICATE OF CORRECTION

PATENT NO. : 6,961,735 B2  Page 1 of 1
APPLICATION NO. : 10/087723
DATED : November 1, 2005
INVENTOR(S) : Tony Gargya et al.

It is certified that error appears in the above-identified patent and that said Letters Patent is hereby corrected as shown below:

On title page, item 30 Foreign Application Priority Data
insert --European Patent Office 01105064.8 March 1, 2001--.

Col. 8, line 20
 In claim 10, replace "sewer"
 with --server--.

Col. 8, line 45
 In claim 13, replace "die"
 with --the--.

Signed and Sealed this

Twenty-seventh Day of May, 2008

JON W. DUDAS
*Director of the United States Patent and Trademark Office*